Jan. 7, 1930.  A. E. DAVENPORT  1,742,901
TANK PUMP
Filed May 4, 1928
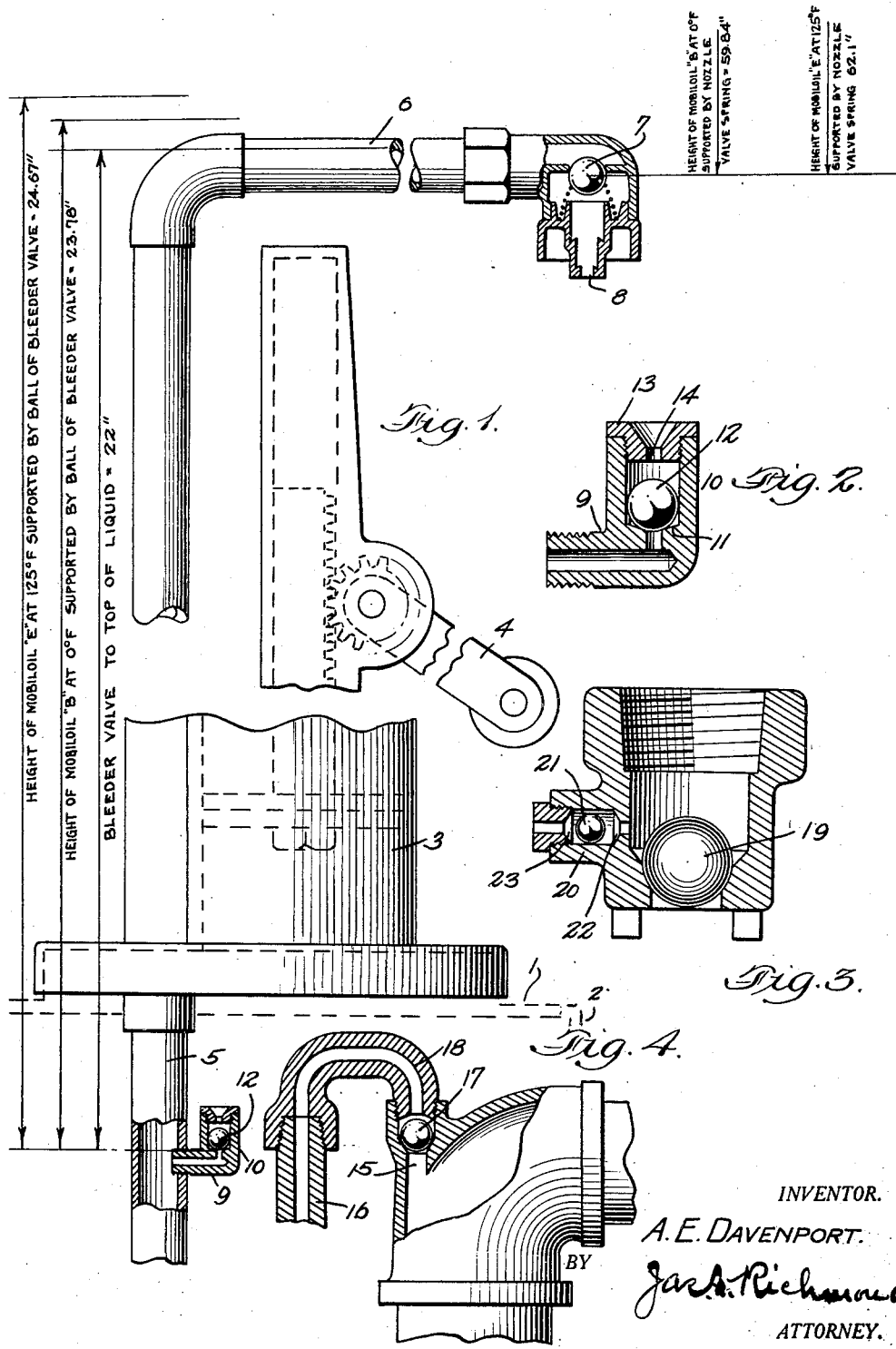
INVENTOR.
A. E. DAVENPORT.
BY
*Jack A. Richmond*
ATTORNEY.

UNITED STATES PATENT OFFICE

ARTHUR E. DAVENPORT, OF MAYWOOD, ILLINOIS

TANK PUMP

Application filed May 4, 1928. Serial No. 275,213.

This invention is directed to tank pumps designed primarily for oil delivery and provides a method of and means for compensating for variations of the oil column due, for example, to temperature conditions, for the purpose and with the result of insuring accuracy with respect to the quantity of oil dispensed and to prevent drip at the nozzle.

In pumps of this character the delivery arm usually is provided with a loaded valve which is responsive to pump pressure and between which and the foot valve there normally exists a column of oil to insure constant priming. Evidently, change of temperature conditions as for example the heat of day following the chill of night will cause such expansion of the column as will operate to displace the loaded delivery valve and permit dripping. The invention is particularly directed to overcoming such condition.

In providing for the desired compensating relief, certain fixed conditions of the pump have to be taken into consideration. For example, the relief valve, under certain conditions, preferably should be of such weight and the angle and area of its seat should be of such proportions that the valve normally will support a column of oil somewhat greater than the normal column and yet will be effective to yield to less pressure than is necessary to displace the delivery valve. Under perfect sealing of the delivery valve the relief valve may be lighter as it is not required to overcome the weight of the liquid column. Furthermore, the relief valve and its upper seat should be so related as to overcome delivery pressure in order that the relief valve will not be held in upper closed position in the event the piston operating handle for any reason be not turned back to relieve the pressure within the pump after the desired delivery of oil.

The method of the present invention, therefore, consists in relieving conditions, making for expansion of the oil column, by providing an automatic bleeding system or compensating relief. The relief may embody a ball and its complemental seat so designed that, at minimum temperature, in order to unseat the valve a column in excess of normal is required; the displacing factor, pressure or expanded volume, however, is so calculated that, while it exceeds the normal column of oil, it is less than that required to unseat the delivery valve. Furthermore, the relief valve must be such that the internal pressure of the pump will hold it off its lower seat while insufficient to hold it against its top seat. Under these conditions the relief valve will float between its seats until liquid flow past the valve relieves the internal pump pressure, following which the valve falls to its lower seat.

Means for practicing the method is exemplified in the accompanying drawings, wherein Figure 1 is a view showing the general arrangement.

Fig. 2 is an enlarged sectional view of the relief valve.

Fig. 3 is a sectional view of the relief valve located in proximity with the foot valve.

Fig. 4 shows the relief valve located externally of the tank and equipped with a drainage return.

Referring to Figure 1, a cover plate 1 is secured upon a tank 2 and supports a cylinder 3 in which operates a piston actuated through the medium of a handle 4 in the conventional manner. The assembly includes a stub or suction pipe 5 extending into the tank and provided near the bottom thereof with the usual foot valve (not shown); and a delivery pipe rising above the cover and having a horizontal arm or gooseneck 6 normally closed by a loaded outlet valve 7 carried by a nozzle 8.

It will be understood that normally there is a column of oil between the foot valve and the delivery valve to maintain a primed condition of the pump. Evidently where the pumps are exposed to varying temperature conditions the volume of oil between the foot valve and nozzle and pump cylinder will react to temperature changes and the expansion, in the absence of compensating provision, is sufficient to unseat the delivery valve 7 and permit dripping.

In relieving this condition it is desirable to salvage the bled oil and, hence, the ideal location of the bleeding valve is inside the tank. In its preferred form the bleeding valve is a nipple 9 tapping the suction pipe and having a head 10 formed with a valve seat 11, and containing a ball valve 12, the head being closed by a cap 13 having a relief port 14 and constituting an upper valve seat.

The operation of the bleeding valve will be evident from a concrete example. Let is be assumed that the relief or bleeding valve is located at a point approximately 22 inches below the top of the liquid in the gooseneck or delivery arm 6. If the weight per gallon of the oil being handled at 0° F. is approximately 7.72 pounds, such weight, i. e. pressure, will be approximately .033 pounds per cubic inch. The area of the contact circle of the valve and seat being calculated at .02 square inches, the pressure of the 22 inch column of oil at 0° F. against this contact circle will be approximately .014 pounds. If the weight of the ball valve used is approximately .016 pounds it will be apparent that the ball will support a column of oil approximately 1¾ inches above the top of the delivery pipe, that is the normal column, and consequently no loss of priming can ensue. Under expansion incident to temperature increase, say at 125° F., the height of the oil column will be approximately 24.67 inches. If the load of the delivery valve 7 is calculated to resist the pressure, or in other words, a column of oil of, say, approximately 60 inches in height, it will be apparent that a bleeder or relief valve of a relative weight cooperating with a seat of a relative size in the above relations will hold to its seat under a normal oil column, and will yield to the pressure of such a column when increased beyond such normal pressure, with such yielding pressure of the valve less than that at which the outlet valve will open.

The relation of the valve and seats should be such that the valve will be held in relief position that is floating between its seats in case the internal pressure of the pump is not manually relieved, as for example if the handle is not turned back to restore the piston after the pumping operation. In a pump of this character the maximum pressure against the relief valve at the end of the pump stroke will be the pressure of the oil from the relief valve to the piston plus the pressure neccessary to raise the piston. In the instance being considered tests have shown that the height of the piston above the valve is approximately 4 inches and that the pressure necessary to raise the piston is approximately ¾ of a pound per square inch. Therefore, the maximum pressure against the relief valve at the finish of a delivery stroke is approximately .88 pounds per square inch. To make certain that this pressure of .88 pounds is not sufficient to hold the ball against its upper seat which would preclude all possibility of relief, we will make the contact circle a 7/64 inch drilled hole, the area of which is .00938. Therefore, the maximum possible pressure within the pump at the conclusion of the delivery stroke tending to hold the relief valve against the upper seat is .00938 × .88672 = .00831 pounds per square inch. The ball, however, weighs approximately twice this amount or .016 pounds, consequently the ball will drop off the upper seat against any possible internal pressure within the pump at the end of the stroke so that relief will not thus be cut off.

It will thus be understood that the pressure necessary to lift the relief valve from its lower seat is less than the internal pressure if handle is not relieved; that such internal pressure is less than that required to hold the valve to its upper seat; that the pumping operation pressure is greater than that necessary to hold the valve against its upper seat; and that the pressure necessary to hold the valve against its upper seat is less than that necessary to open the loaded delivery or nozzle valve.

It will of course be appreciated that under theoretically correct conditions it is not necessary that the relief valve be of sufficient weight to overcome the particular column of liquids. For example, if the loaded nozzle or delivery valve is perfect in function, the loss of prime in the column could not occur even if the relief valve were of insufficient weight in itself to overcome the liquid column, and such an arrangement is of course the actual inventive thought contemplated; but to provide for the probable imperfect function of the nozzle or delivery valve, as where a speck of foreign matter precludes perfect seating, the weight of the relief valve should be as described. Thus while holding the theory of the invention to be that the relief valve need not be of the weight stated, practice may require it. Therefore, in that aspect, the invention contemplates both the lighter and relatively heavier types of valves to cover all possible emergencies.

In Fig. 4 there is illustrated a modified relief system in which the elbow of the delivery arm is formed with an opening 15 tapped for drainage return pipe 16 leading to the tank, a relief valve in the form of a ball 17 opening against pressure from within the delivery pipe. It is to be noted that the drainage pipe 16 has a return bend 18 located above the extreme level of the oil in the delivery arm. In this type the bleeder does not support the column of oil, but responds to expansion thereof to permit the excess to return to the tank. This type has the merit that if, for any reason, the delivery and bleeder valves should be unseated as by the accumulation of any dirt or specks between the valves and their seats, priming will not be lost for the reason that the upper portion of the relief pipe is above the normal head of this column.

Fig. 3 shows another type in which the stub or suction pipe 5, is formed or provided, immediately above the foot valve 19, with a valve head 20 having a ball valve 21 operative between two seats 22 and 23. This valve, likewise, does not support the column of oil in the delivery circuit, and normally is in neutral or unseated position. On the suction stroke of the pump the valve is moved to its inner seat 22 to close the bleeder opening of the suction pipe, and on the discharge stroke the valve is shifted to its outer seat.

Having described my invention, I claim:

1. A tank pump for oil delivery including a delivery pipe, a loaded outlet valve therefor, and a relief valve for such pipe, said valve being held closed by pressures equalling that of the normal column of oil in such pipe and that of delivery past the outlet valve, and opened under pressures intermediate that of the normal column and delivery.

2. A tank pump for oil delivery including a delivery pipe, a loaded outlet valve therefor, and a relief valve for such pipe, the weight of the valve and the area of its seat holding the valve closed under pressures of the normal column of oil in such pipe and under the delivery pressure sufficient to open the outlet valve and opening the valve under intermediate pressures.

3. A tank pump for oil delivery, including a delivery pipe, a loaded outlet valve therefor, a relief valve for such pipe, a seat for such valve through which the valve is open to the pressure of the oil column in said pipe, the relation of the weight of the valve and pressure area of its seat insuring that the valve will remain closed under the pressure of the normal column of oil in said pipe and will be opened under relatively increased pressure.

4. A tank pump for oil delivery, including a delivery pipe, a loaded outlet valve therefor, a relief valve for such pipe, a seat for such valve through which the valve is open to the pressure of the oil column in said pipe, the weight of the valve under the pressure admitted through the seat holding the valve to its seat under normal oil-column pressure, and being overcome to unseat the valve under increasing pressure in said column, and a second seat for the valve with which the valve cooperates under pressure in said oil column sufficient to open the outlet valve.

5. A liquid dispensing pump, comprising, a cylinder, a piston mounted in said cylinder, means for reciprocating said piston in said cylinder, a valve controlled liquid inlet for said cylinder, a liquid discharge nozzle connected to said cylinder, a pressure controlled valve in said nozzle adapted to permit outflow of liquid as the piston is moved in the direction to discharge the liquid in the cylinder, and means for relieving gradual pressures generated by thermal expansion of the liquid.

6. A liquid dispensing pump, comprising, a cylinder, a piston mounted in said cylinder, means for reciprocating said piston in said cylinder, a valve controlled liquid inlet for said cylinder, a liquid discharge nozzle connected to said cylinder, a pressure controlled valve in said nozzle adapted to permit outflow of liquid as the piston is moved in the direction to discharge the liquid in the cylinder, a secondary outlet passageway communicating with said cylinder adjacent to the top thereof, and a normally unseated valve in said passageway, said valve adapted to seat and inhibit outflow of liquid therethrough in response to sudden pressure such as that occasioned by motion of the piston in the discharge direction.

7. A liquid dispensing pump, comprising, a cylinder, a piston mounted in said cylinder, means for reciprocating said piston in said cylinder, a valve controlled liquid inlet for said cylinder, a liquid discharge nozzle connected to said cylinder, a spring seated valve in said nozzle, said valve pressure sensitive to unseat and permit outflow of liquid as the piston is moved in the direction to discharge the liquid in the cylinder, a secondary outlet passage communicating with said cylinder adjacent to the top thereof, and a normally unseated valve in said passageway, said valve pressure sensitive to seat and inhibit outflow of liquid therethrough in response to sudden pressure such as that occasioned by motion of the piston in the discharge direction but unsensitive to the gradual pressure of thermal expansion of the liquid.

8. A liquid dispensing pump, comprising, a chamber, means for expelling liquid from said chamber, a nozzle connected to said chamber and forming an outlet therefor, a valve member in said nozzle, said valve member adapted to maintain the nozzle normally closed but adapted to unseat and open the nozzle responsively to pressure from the liquid being expelled from said chamber, and a secondary outlet to said chamber to relieve pressure caused by the thermal expansion of the liquid.

9. A liquid dispensing pump, comprising, a supply container, a chamber, means for expelling liquid from said chamber, a nozzle connected to said chamber and forming an outlet therefor, a spring seated valve member exposed to the pressure of the liquid being expelled to unseat responsively to said pressure, and a secondary outlet to said chamber, communicating with the container and controlled by a valve sensitive to sudden pressure but unsensitive to gradual pressure so that the liquid pressure caused by thermal expansion is relieved but the more sudden pressure expelling the liquid is confined.

10. A device of the class described, comprising, a chamber for liquid, means for completely filling said chamber, an outlet for normal dispensing expulsion of said liquid, piston means for expelling said liquid, a valve in said outlet sensitive to dispensing expulsion forces, a second outlet, and a valve controlling the second outlet, said valve non-sensitive to liquid expansion forces but seated by expulsion forces.

In testimony whereof I affix my signature.

ARTHUR E. DAVENPORT.